UNITED STATES PATENT OFFICE.

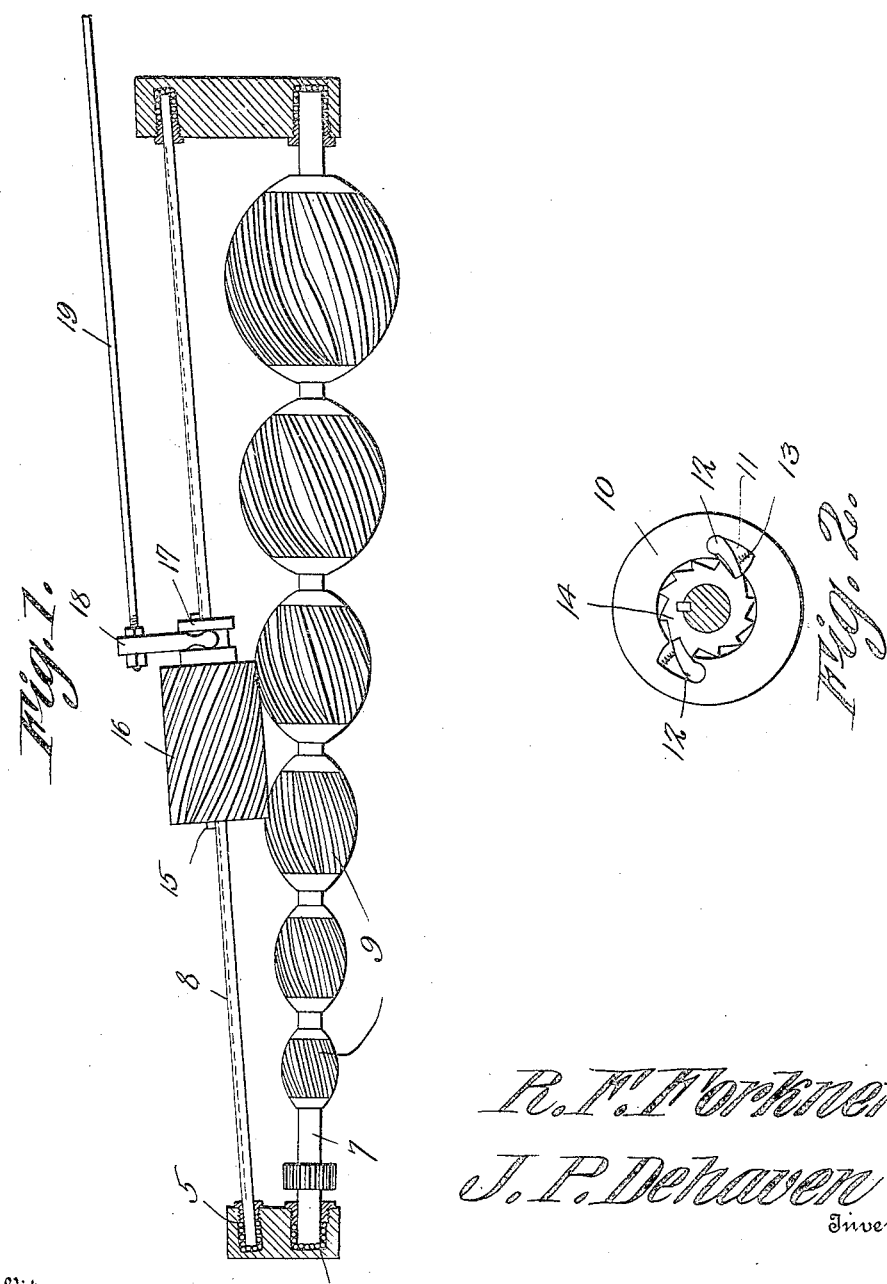

ROBERT F. FORKNER AND JOSEPH P. DEHAVEN, OF PRINCETON, WEST VIRGINIA.

GEAR-SHIFT.

1,379,753.  Specification of Letters Patent.  Patented May 31, 1921.

Application filed August 10, 1920. Serial No. 402,514.

*To all whom it may concern:*

Be it known that we, ROBERT F. FORKNER and JOSEPH P. DEHAVEN, citizens of the United States, residing at Princeton, in the county of Mercer, State of West Virginia, have invented a new and useful Gear-Shift, of which the following is a specification.

The present invention relates to gearing, and more particularly to gearing employed in connection with motor vehicles, it being an object of the invention to provide a gearing of a novel construction, whereby the movement of a drive shaft may be transmitted to a driven shaft to rotate at various speeds.

A further object of the invention is to provide a device of this character which will permit of the changing of speed without going out of gear, thus obviating the necessity of throwing out the clutch, if used on motor vehicles, to accomplish the changing of speed.

With the foregoing and other objects in view which will appear as the description proceeds, the invention resides in the combination and arrangement of parts and in details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a gearing constructed in accordance with the present invention.

Fig. 2 illustrates a transverse sectional view taken through one of the gears.

Referring to the drawing in detail, the reference character 5 designates suitable bearings supported in any suitable manner, and provided with openings to accommodate ball bearings 6, which receive the ends of the shafts 7 and 8.

The shaft 7, is the drive shaft, and has suitable connection with a power generating means not shown, whereby rotary motion is imparted to the shaft 7, which in turn is transmitted to the shaft 8, which is the driven shaft, and which transmits rotary motion to any suitable means not shown.

Supported on the shaft 7 are a plurality of gears indicated by the reference character 9, which gears vary in diameter, there being a relatively small gear at one extremity of the shaft 7, while at the opposite end thereof is provided a relatively large gear, the gears between the relatively small gear and the relatively large gear varying in size to permit the driven shaft to be operated at various speeds.

Each of these gears 9 includes an outer member 10, which is provided with cut out portions 11, which cut out portions accommodate the pivoted pawls 12 which are normally urged toward the shaft 7, by means of the coiled springs 13 operating against one edge of the respective pawls.

Keyed to the shaft 7, are ratchet wheels 14, which ratchet wheels coöperate with the pawls 12 for connecting the outer member 10 and the shaft 7, when the shaft 7 and outer member 10 are rotating at the same rate of speed, but when the speed of the outer member exceeds the speed of the shaft, the outer member is permitted to rotate around the ratchet wheel 14 associated therewith.

The driven shaft 8 is provided with a key-way extending throughout its length, the key-way being designed to accommodate the key 15 which passes through a suitable opening in the gear wheel 16, to key the gear wheel 16 to the shaft 8, in a manner to permit movement of the gear 16 longitudinally of the shaft 8 so that the gear 16 may be moved into coöperative relation with any one of the gears 9, to change the speed of the driven shaft.

Forming a part of the gear 16 is a collar indicated at 17, which collar accommodates the arm 18 that is carried at one end of the operating rod 19.

From the foregoing it is obvious that by movement of the rod 19, the gear 16 may be moved longitudinally of its shaft to bring the teeth thereof into mesh with the teeth of any one of the gear wheels 9, to accomplish the change of speed.

We claim:

1. In a change speed mechanism, a drive shaft and a driven shaft, a plurality of gear wheels carried by the drive shaft, said gear wheels being of various diameters and having teeth formed spirally on the periphery thereof, a gear wheel splined on the driven shaft and having spirally formed teeth adapted to move into coöperative relation with a gear on the drive shaft, and means to permit rotation of the first mentioned gear wheel with relation to the drive shaft.

2. In a change speed mechanism, a drive shaft and a driven shaft, a plurality of gear wheels carried by the drive shaft, said gear wheels being oval in formation and having spirally formed teeth on the periphery thereof, a gear wheel splined on the driven shaft, means for moving the last mentioned gear wheel into mesh with a gear wheel of the first mentioned shaft, and means to permit rotation of the first mentioned gear wheels with relation to the drive shaft.

In testimony that we claim the foregoing as our own, we have hereto affixed our signatures in the presence of two witnesses.

ROBERT F. FORKNER.
JOSEPH P. DEHAVEN.

Witnesses:
J. C. CARTER,
W. D. BURWELL.